Patented May 17, 1949

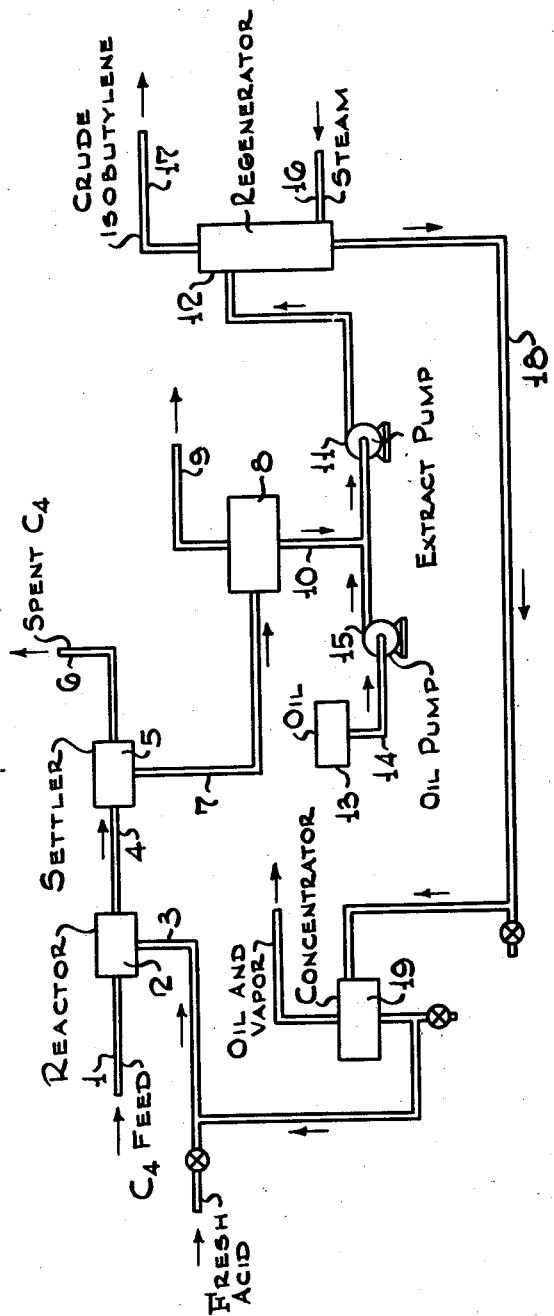

2,470,207

UNITED STATES PATENT OFFICE 2,470,207

ISOBUTYLENE EXTRACTION

Bowman S. Garrett, Brooklyn, N. Y., assignor to Standard Oil Development Company, a corporation of Delaware Application April 11, 1946, Serial No. 661,186

3 Claims. (Cl. 260—677)

This invention relates to improvements in the recovery of isobutylene from sulfuric acid extracts.

Isobutylene is separated from other C4 hydrocarbons by absorption in sulfuric acid of 55–70% by weight concentration. Isobutylene is regenerated by steam distillation of the said sulfuric acid extract but this regeneration must be run relatively slowly as foaming is a limiting factor, and if the rate of regeneration is hastened a part of the acid will spill over with the isobutylene.

According to this invention, it has now been found that foaming can be reduced and practically eliminated during the steam stripping by the introduction of a hydrocarbon oil alone or in admixture with a material such as an alcohol.

In a laboratory experiment, using a small glass regenerator in which a constant flow dropping funnel was provided for controlling and measuring the extract containing the absorbed isobutylene, and an orifice-type flow meter for steam, the effects of the oil were evaluated. The regeneration chamber was a 36-inch vacuum jacketed column 1-inch in diameter containing an 18-inch packed section.

In preliminary investigations, the foaming was found to be dependent upon the packing surface. In an attempt to find a material which would wet the packing and thus inhibit the foaming, gas oil suspended in tertiary butyl alcohol was added. The foam was found to break immediately, but, on the other hand, it was found to be necessary to reduce the feed rate as the resulting liquid flooded the top of the packing. When the column was no longer flooded, the feed was again introduced at a rate approximately twice as great as that previously possible, without the occurrence of foaming. When the oil suspension was stopped, foaming soon began again and it was necessary to cut the rate back again. It was found that the use of 1 to 2 volume percent of a tertiary butyl alcohol solution containing 3 to 4% oil added to the top of the laboratory regenerator gave satisfactory results. Some alcohol distills in the isobutylene regeneration, and may conveniently be used to prepare the oil suspension. An acid-treated spindle oil produced by treatment of suitable petroleum fraction with concentrated or fuming sulfuric acid, suitably acid of 85–95 wt. per cent strength (carbon free basis), gave good laboratory results and was recommended for use in plant operations. Other oils, such as an acid-stable hydrocarbon boiling in the range of 400° to 900° F. preferably 500° to 800° F. would be suitable. These may also be clay treated.

The invention on a plant scale is described with reference to the accompanying drawing. A mixture of hydrocarbons containing isobutylene is passed by means of pipe 1 into a reactor 2 together with sulfuric acid of 55–70% by weight concentration, which is introduced by means of pipe 3. The emulsion obtained in reactor 2 is then passed by means of pipe 4 into settling chamber 5, from which the unreacted hydrocarbons are removed by means of pipe 6. The sulfuric acid extract is passed from settler 5 by means of pipe 7 into vent drum 8, from which normal butylenes are removed by means of pipe 9, and the residual acid extract containing isobutylene is then passed by means of pipe 10 and extract pump 11 into regenerator 12. Oil is passed from oil storage tank 13 by means of pipe 14 and pump 15 to pipe 10. Steam is introduced into regenerator 12 by means of pipe 16, and isobutylene is distilled overhead by means of pipe 17, the spent sulfuric acid being removed by means of pipe 18 to acid reconcentrator 19 from which oil and vapors are removed overhead. Reconcentrated sulfuric acid is removed from concentrator 19 by means of pipe 3.

The production rate of isobutylene was 40 tons per day when no oil was injected into the sulfuric acid extract. This production was limited by foaming phenomena in regenerator 12 but upon the introduction of about 1 pint of oil per hour, or about 0.005 weight per cent of oil based upon the extract, the production rate was raised from 40 tons per day to 50 or 60 tons per day, these values being limited by feed availability.

The oil used in this plant operation was an acid-treated spindle oil of the following specification.

| | |
|---|---|
| Initial Boiling Point, °F | 475–500 |
| Final Boiling Point, °F | 800 |
| Gravity, °API | 29.4 |
| Flash, °F. (Cleveland Open Cup) | 370 |
| Viscosity @ 100° F., Saybolt Seconds Universal | 107 |
| Viscosity @ 210° F., Saybolt Seconds Universal | 39.7 |
| Viscosity Index | 86 |
| Pour Point, °F | 35 |
| Color, Robinson | 13 |
| Carbon, Conradson | 0.02 |
| Steam Emulsion No | 161 |
| Neutralization No | 0.01 |

Other oils may be used, and it was found that, where a good dispersion of the oil in the acid extract is obtained, foaming is substantially eliminated.

I claim:

1. In a system for the recovery of isobutylene from a predominantly $C_4$ hydrocarbon feed stock comprising isobutylene involving contacting the feedstock with sulfuric acid in a reaction zone under conditions to form an extract, followed by removal of the extract from the reaction zone to a regeneration zone where the extract is heated under a pressure substantially less than that in the reaction zone to cause vaporization of a major portion of the hydrocarbons from said extract and recovery of the sulfuric acid and recycling of the recovered sulfuric acid to the reaction zone, the step of adding a mineral oil boiling in the range of 400° to 900° F. to the thus circulated sulfuric acid in sufficient amount substantially to eliminate foaming in the regeneration zone.

2. Process according to claim 1 in which the oil is added in an amount between 0.005 to 0.10 weight percent.

3. Process according to claim 1 in which the added oil is supplied as a suspension in tertiary butyl alcohol.

BOWMAN S. GARRETT.

REFERENCES CITED

The following references are of record in the file of this patent:

UNITED STATES PATENTS

| Number | Name | Date |
| --- | --- | --- |
| 2,373,951 | Evans et al. | Apr. 17, 1945 |
| 2,381,658 | Fessler | Aug. 7, 1945 |
| 2,400,376 | Showatter | May 14, 1946 |